July 14, 1942.　　　E. HAZELL　　　2,289,777
TREATMENT OF RUBBER
Filed Oct. 28, 1939
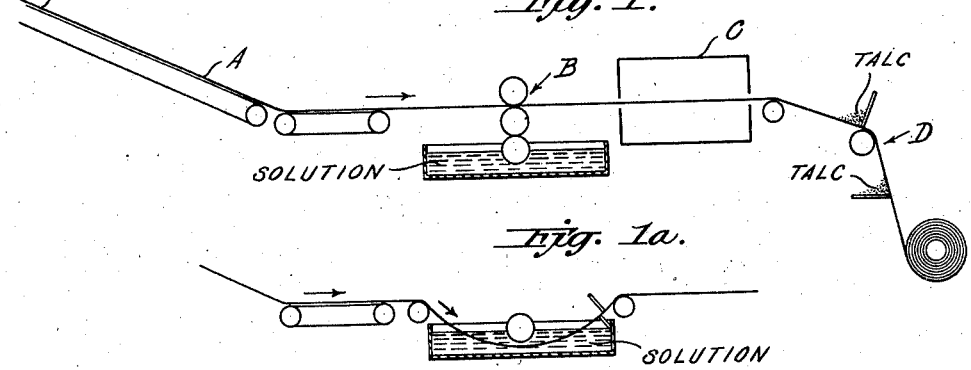
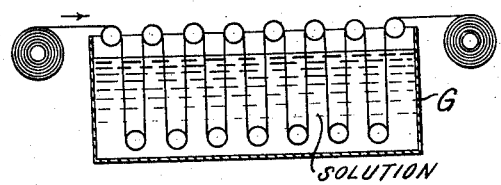
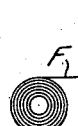
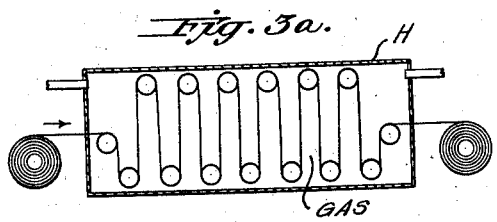
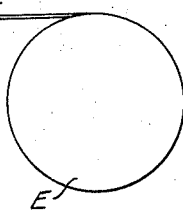
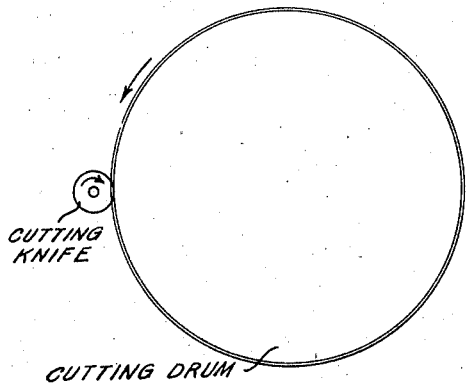
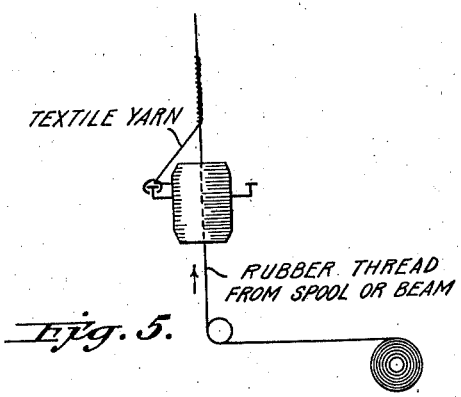
INVENTOR.
EARDLEY HAZELL
BY Gourley & Budlong
ATTORNEYS Patented July 14, 1942

2,289,777

UNITED STATES PATENT OFFICE 2,289,777

TREATMENT OF RUBBER

Eardley Hazell, North Kingstown, R. I., assignor to United States Rubber Company, New York, N. Y., a corporation of New Jersey Application October 28, 1939, Serial No. 301,768

7 Claims. (Cl. 18—54)

This invention relates to improvements in treating rubber and more particularly rubber intended to be used as a foundation for textile yarns, for example, yarn covered rubber thread or elastic webbing.

Heretofore, in the making of yarn covered rubber thread and elastic webbing, it has been necessary to subject the vulcanized uncut once calendered rubber sheet to a secondary calendering or spreading operation after the vulcanization, to apply an adhesive coating to the vulcanized uncut sheet, or where the vulcanized sheet is cut to thread to apply an adhesive coating to the vulcanized cut thread by solution coating. The calendering coating of vulcanized sheet requires, for best results, that it be run on sheets of narrow width. Furthermore, defective or waste material may result if the calender setting is so close that the vulcanized sheet is nipped, or pinched, and consequently injured; or if the setting is so great that a surplus of unvulcanized rubber is applied to the vulcanized sheet. All this limits vulcanizing and calendering output. In the case of the solution method on vulcanized thread to apply a sticky coating, equipment must be provided for coating, drying and talcing individual threads. The present invention avoids these disadvantages, allowing of treatment of unvulcanized sheet of full widths before curing, and avoiding the hazards and expense of a second calendering operation, while allowing the provision of elastic webbing containing elastic yarns having improved resistance to needle cutting and improved flexing life over ordinary elastic webbing.

An object of the invention is to treat unvulcanized rubber containing vulcanizing ingredients intended as a base for textile yarns, so that an outer surface thereof is rendered tacky by a tack-conferring inhibitor of vulcanization applied to such surface. A further object is to utilize and control such tack-conferring inhibitors of vulcanization in a manner to maintain the tacky rubber surface while allowing vulcanization of the main body of the rubber. Another object is to utilize tack-conferring inhibitors of vulcanization in the manufacture of rubber thread, at a stage prior to vulcanization, so as to subsequently provide a rubber surface which, when covered with textile yarns, will anchor and embed the yarns. Other objects will be apparent from the following description.

I attain these objects by means illustrated in the accompanying drawing in which:

Figure 1 diagrammatically shows means for coating one side of a calendered sheet and subsequently drying, talcing and winding up the calendered sheet; Fig. 1a shows a modification in which both sides of the sheet are treated with the chemical;

Figure 2 shows re-wrapping the treated rubber sheet together with a wrapping cloth;

Figure 3 shows solution means for neutralizing the tack-conferring inhibitor; Fig. 3a shows a modification in which gaseous means is used for said neutralization;

Figure 4 shows a cutting drum and cutting knife for reducing the sheet to thread form; and Figure 5 diagrammatically shows yarn applying means for wrapping yarn about the treated rubber thread.

According to the invention an adhesive coating or layer is created on an outer surface of the unvulcanized rubber composition, with substantially no change in volume, by penetration therein of a tack-conferring migratory chemical capable of inhibiting or retarding the vulcanization of the rubber outer surface on subsequent subjection to vulcanizing temperatures while allowing maintenance of a sticky or tacky surface. The chemical may be applied to the unvulcanized surface in any suitable manner, as a powder, or in solution, so as to best effect a softening and tackiness of the outer surface of the rubber.

The chemical or chemicals, after application to the unvulcanized rubber surface, diffuses or migrates subsequently into the surface of the rubber but to a slight extent, for example, for a depth of one or two thousandths of an inch, and restrains vulcanization in the outer part of the rubber mass on the subsequent vulcanization by heat. After the sheet is vulcanized according to conventional methods, it may, if desired, be treated with other chemicals to neutralize the tack-conferring chemicals, or otherwise treated to remove their vulcanization retarding influence, so as to permit the surface of the rubber to vulcanize on subsequent heating. Where the chemicals are of acid character, bases may be used to neutralize them, for example ammonia gas, substituted ammonia, i. e. alkylamines, e. g. dimethylamine, alkalies like caustic soda solution, etc.

The following example is given to illustrate the invention, the parts being by weight:

A sheet of unvulcanized cut thread stock is formed by conventional methods. As an example, a mix is made of the following composition:

| | Parts |
|---|---|
| Crepe rubber | 100 |
| Zinc oxide | 5 |
| Mercaptobenzothiazole (accelerator) | 0.60 |
| Sulfur | 3.25 |
| Lithopone | 5.00 |
| Stearic acid | 1.00 |
| Organic color | 0.03 |
| Total | 114.88 |

The mix is calendered to any desired gauge, for example .020", and the chemical, or mixture of the chemicals, is applied to one or both surfaces. As a tack-conferring chemical one can use thio-salicylic acid dissolved in acetone in the proportion of 10 grams thiosalicylic acid dissolved in 100 ccs. acetone.

As generally described in the appended drawing (Fig. 1), the calendered sheet A is drawn through a device B which coats at least one side with this solution, then through a drying box C to remove acetone vapors, then through a talcing device D which talcs both sides of the sheets. If desired, the sheet may be wound up. Both sides of the sheet can be more effectively treated with the solution by making device B a container containing the solution, and running the sheet through as shown in Fig. 1a.

The treated sheet is then wrapped on a vulcanizing drum E together with a cotton wrapping cloth F of the usual type is shown in Fig. 2, and the wrapped sheet vulcanized. The preferred cure is for two hours at 228° F. in water.

A tacky surface on the cured thread sheet is created by the application of thio-salicylic acid dissolved in acetone, to the uncured sheet. Acetone does not penetrate into the raw stock more than one or two thousandths of an inch, and when it evaporates, it leaves the thio-salicylic acid behind.

When the sheet is vulcanized, the thio-salicylic acid inhibits vulcanization where it is present, so that the resulting vulcanized sheet has a tacky surface or surfaces due to cure inhibition, while the main body of the sheet is properly vulcanized. Rubber thread formed from such a sheet is described as having a surface composed of soft unvulcanized rubber on one or more faces.

Preferably, the original inhibitor is then neutralized as by dimethylamine, ammonia gas, or caustic soda, as diagrammatically shown in Fig. 3 where the sheet is treated with solution in a container G, and Fig. 3a shows where it is treated with gas in a gassing chamber H. The vulcanized sheet is then cut to thread form on a cutting drum as diagrammatically shown in Fig. 4. The thread then goes to the textile covering operation with the soft, tacky surface unvulcanized, so that the textile covering yarns may be embedded. The surface is preferably talced, before applying the yarn as shown diagrammatically in Fig. 5. After this embedding takes place, and said elastic yarns, in the form of webbing or braid, go through the textile finishing operation, where heat is used, vulcanization will start, anchoring the previously embedded textile yarns in the now vulcanized, or partially vulcanized, soft tacky outer layer of the thread.

For producing a tacky or uncured surface on the vulcanized sheet, other acidic chemicals may be used among them being salicylic acid, phthalic anhydride, etc. The chemical may be dissolved in non-rubber solvents other than acetone, as for example ethyl alcohol, methyl alcohol, etc. Or these cure retarding or inhibiting chemicals may be used as powders applied to the surface of rubber without use of solvent, either full strength or diluted by admixture with talc, starch, flour, clay, etc.

Having thus described my invention, what I claim and desire to protect by Letters Patent is:

1. A process of making rubber thread which comprises treating an outer surface of a sheet of unvulcanized rubber composition containing vulcanizing ingredients, with a migratory tack-producing acidic chemical so that the volume of the mass remains substantially unaltered and the chemical penetrates into the outer surface to render the outer surface soft and tacky when the treated sheet is vulcanized, and subsequently vulcanizing the rubber portion into which the chemical has not penetrated and cutting the rubber into thread.

2. A process of making covered rubber thread which comprises treating an outer surface of a sheet of unvulcanized rubber composition containing vulcanizing ingredients, with a migratory tack-producing acidic chemical so that the volume of the mass remains substantially unaltered and the chemical penetrates into the outer surface to render the outer surface soft and tacky when the treated sheet is vulcanized, subsequently vulcanizing the rubber portion into which the chemical has not penetrated and cutting the rubber into thread, and adhering textile yarn to the soft rubber surface.

3. A process of making covered rubber thread which comprises treating a sheet of unvulcanized rubber composition containing vulcanizing ingredients, on at least one outer surface of the sheet with a migratory tack-producing acidic chemical having vulcanization inhibiting properties and for a time so that only an outer layer of the rubber is treated, and while the outer surface is in a treated condition relative to the center of the rubber mass, vulcanizing the rubber portion into which the chemical has not penetrated, cutting the rubber into thread, and covering the rubber while in thread form and having said soft outer layer, with textile yarn, whereby to embed the yarn in the soft outer rubber layer.

4. A process of making rubber thread which comprises treating a sheet of unvulcanized rubber composition containing vulcanizing ingredients, on at least one outer surface of the sheet with a migratory tack-producing acidic chemical having vulcanization inhibiting properties and for a time so that only an outer layer of the rubber is treated, and while the outer surface is in a treated condition relative to the center of the rubber mass, vulcanizing the rubber portion into which the chemical has not penetrated, removing the vulcanization retarding influence of the said chemical, and cutting the rubber into thread.

5. A process of making covered rubber thread which comprises treating a sheet of unvulcanized rubber composition containing vulcanizing ingredients, on at least one outer surface of the sheet with a migratory tack-producing acidic chemical having vulcanization inhibiting properties and for a time so that only an outer layer of the rubber is treated, and while the outer surface is in a treated condition relative to the center of the rubber mass, vulcanizing the rubber portion into which the chemical has not penetrated, removing the vulcanization retarding influence of the said chemical, cutting the rubber into thread, and covering the rubber while in thread form and having said softer outer layer, with textile yarn, whereby to embed the yarn in the soft outer rubber layer.

6. A process which comprises treating, prior to vulcanization, a sheet of unvulcanized rubber composition containing vulcanizing ingredients, with a migratory tack-producing acidic chemical so that the volume of the mass remains substantially unaltered and the chemical penetrates into the outer surface to render the outer surface soft and tacky when the treated sheet is vulcanized and subsequently vulcanizing the rubber portion into which the chemical has not penetrated.

7. A process which comprises treating, prior to vulcanization, a sheet of unvulcanized rubber composition containing vulcanizing ingredients, with an acetone solution of thio-salicylic acid so that the volume of the mass remains substantially unaltered and the chemical penetrates into the outer surface to render the outer surface soft and tacky when the treated sheet is vulcanized and subsequently vulcanizing the rubber portion into which the chemical has not penetrated.

EARDLEY HAZELL.